US007599828B2

(12) United States Patent
Fontenelle et al.

(10) Patent No.: US 7,599,828 B2
(45) Date of Patent: Oct. 6, 2009

(54) GRAMMATICALLY CORRECT CONTRACTION SPELLING SUGGESTIONS FOR FRENCH

(75) Inventors: Thierry Fontenelle, Redmond, WA (US); Nicholas Van Caldwell, Lake Forest Park, WA (US)

(73) Assignee: Microsoft Corporation, Redmond, WA (US)

( * ) Notice: Subject to any disclaimer, the term of this patent is extended or adjusted under 35 U.S.C. 154(b) by 375 days.

(21) Appl. No.: 11/069,070

(22) Filed: Mar. 1, 2005

(65) Prior Publication Data
US 2006/0200340 A1 Sep. 7, 2006

(51) Int. Cl.
*G06F 17/20* (2006.01)
(52) U.S. Cl. .............. 704/1; 707/3; 707/4; 707/6; 707/7; 707/9; 707/244; 707/257; 707/266; 713/177; 345/173; 382/229
(58) Field of Classification Search .............. 707/3, 707/4, 6; 704/266, 244, 9, 7, 257; 713/177; 345/173; 382/229
See application file for complete search history.

(56) References Cited

U.S. PATENT DOCUMENTS

| | | | | | |
|---|---|---|---|---|---|
| 4,868,743 | A | * | 9/1989 | Nishio | 707/3 |
| 4,991,094 | A | * | 2/1991 | Fagan et al. | 704/9 |
| 5,040,213 | A | * | 8/1991 | Yasuda et al. | 704/244 |
| 5,150,409 | A | * | 9/1992 | Elsner | 713/177 |
| 5,157,759 | A | * | 10/1992 | Bachenko | 704/266 |
| 5,299,125 | A | * | 3/1994 | Baker et al. | 704/9 |
| 5,541,836 | A | * | 7/1996 | Church et al. | 704/7 |
| 5,642,519 | A | * | 6/1997 | Martin | 704/9 |
| 5,680,628 | A | * | 10/1997 | Carus et al. | 704/1 |
| 5,896,139 | A | * | 4/1999 | Strauss | 345/440 |
| 5,974,413 | A | * | 10/1999 | Beauregard et al. | 707/6 |
| 6,385,568 | B1 | * | 5/2002 | Brandon et al. | 704/7 |
| 6,539,348 | B1 | * | 3/2003 | Bond et al. | 704/9 |
| 6,581,034 | B1 | * | 6/2003 | Choi et al. | 704/238 |
| 6,757,647 | B1 | | 6/2004 | Nathan et al. | 704/10 |
| 6,829,580 | B1 | * | 12/2004 | Jones | 704/257 |
| 7,088,345 | B2 | * | 8/2006 | Robinson et al. | 345/173 |
| 2004/0037470 | A1 | * | 2/2004 | Simske | 382/229 |
| 2004/0205672 | A1 | | 10/2004 | Bates et al. | 715/533 |
| 2006/0004744 | A1 | * | 1/2006 | Nevidomski et al. | 707/4 |

OTHER PUBLICATIONS

Pelillo et al, "Probabilistic Prediction of Parts-of-Speech from Word Spelling Using Decision Trees," Proceedings of the International Conference on Spoken Language Processing, Oct. 12-16, 1992.
The European Search Report from Application No. 06110445.1, filed Feb. 27, 2006.
An Official Communication from Application No. 06110445.1, filed Feb. 27, 2006.

* cited by examiner

*Primary Examiner*—Talivaldis Ivars Smits
*Assistant Examiner*—Michael C Colucci
(74) *Attorney, Agent, or Firm*—Theodore M. Magee; Westman, Champlin, & Kelly, P.A.

(57) ABSTRACT

A method and product are provided that identify properly spelled words from an input string. Separate lexical entries are identified for different parts of an input word. Grammatical information associated with one of the lexical entries is examined to determine if it satisfies a grammatical constraint associated with another of the lexical entries. A properly spelled word is formed by combining the separate lexical entries if the grammatical information satisfies the constraint. Under some embodiments of the invention, the separate lexical entries are identified by performing a first search of a lexicon using a first part of the input string and by performing a second search of the lexicon using a second part of the input string.

14 Claims, 4 Drawing Sheets

GRAMMATICALLY CORRECT CONTRACTION SPELLING SUGGESTIONS FOR FRENCH

BACKGROUND OF THE INVENTION

The present invention relates to automated spell checking. In particular, the present invention relates to suggesting contractions as alternatives to misspelled words.

The role of the spell checker is to identify spelling mistakes and to offer suggestions to correct them. Typically, such spell checking is performed by comparing an input string to entries in a lexicon. If an entry is found that matches the word, the spell checking system assumes that the word is correctly spelled. If no matching word can be found, the spell checker returns a suggestion of possible words in the lexicon that the user may have been trying to spell. These words are selected by comparing the input string to each word in the lexicon and identifying those words that are closest to the input string.

The distance between the input string and a word in a lexicon is measured differently by different spell checkers but in general is based on the number of deletions, additions, permutations or substitutions that must be performed on the word in the lexicon to form the misspelled word. Words that are further than some threshold distance from the input string are not suggested to the user as alternatives because it is unlikely that the user has made so many spelling mistakes and suggesting words that are substantially different from the input string can cause users to lose confidence in the system.

While such spell checkers have worked well in many languages, they have produced a large number of poor suggestions for French contractions that are missing an apostrophe.

In French, it is common to form a contraction by shortening a word such as "le" into an elided form such as "l" and appending the elided word to the next word in the sentence using an apostrophe. For example, instead of writing "le arbre" (the tree) the contraction "l'arbre" is used.

One common mistake is to forget the apostrophe when forming the contraction during writing. Thus, for example, the user may type "lorange" when the correct form is "l'orange".

Although it is possible to form all of the contractions as lexical entries, this would cause the lexicon to be very large. For example, there would need to be an entry for "orange" and for "l'orange". To avoid this, systems have attempted to dynamically identify when an apostrophe may be missing from a contraction. However, these systems have typically used simple rules that identify a first letter or set of letters as belonging to a set of elided words, and then simply suggesting placing an apostrophe between the identified letters and the remaining portion of the word.

These simple rules have resulted in a large number of meaningless suggestions being provided to the user since a large number of the contractions formed by the rules are grammatically incorrect.

Thus, a spell checker is needed that provides grammatically correct suggestions to the user when suggesting contractions as possible spelling alternatives to words provided by the user without requiring each individual contraction to be found in the lexicon.

SUMMARY OF THE INVENTION

A method and product are provided that identify properly spelled words from an input string. Separate lexical entries are identified for different parts of an input word. Grammatical information associated with one of the lexical entries is examined to determine if it satisfies a grammatical constraint associated with another of the lexical entries. A properly spelled word is formed by combining the separate lexical entries if the grammatical information satisfies the constraint. Under some embodiments of the invention, the separate lexical entries are identified by performing a first search of a lexicon using a first part of the input string and by performing a second search of the lexicon using a second part of the input string.

DETAILED DESCRIPTION OF ILLUSTRATIVE EMBODIMENTS

Figure 1:
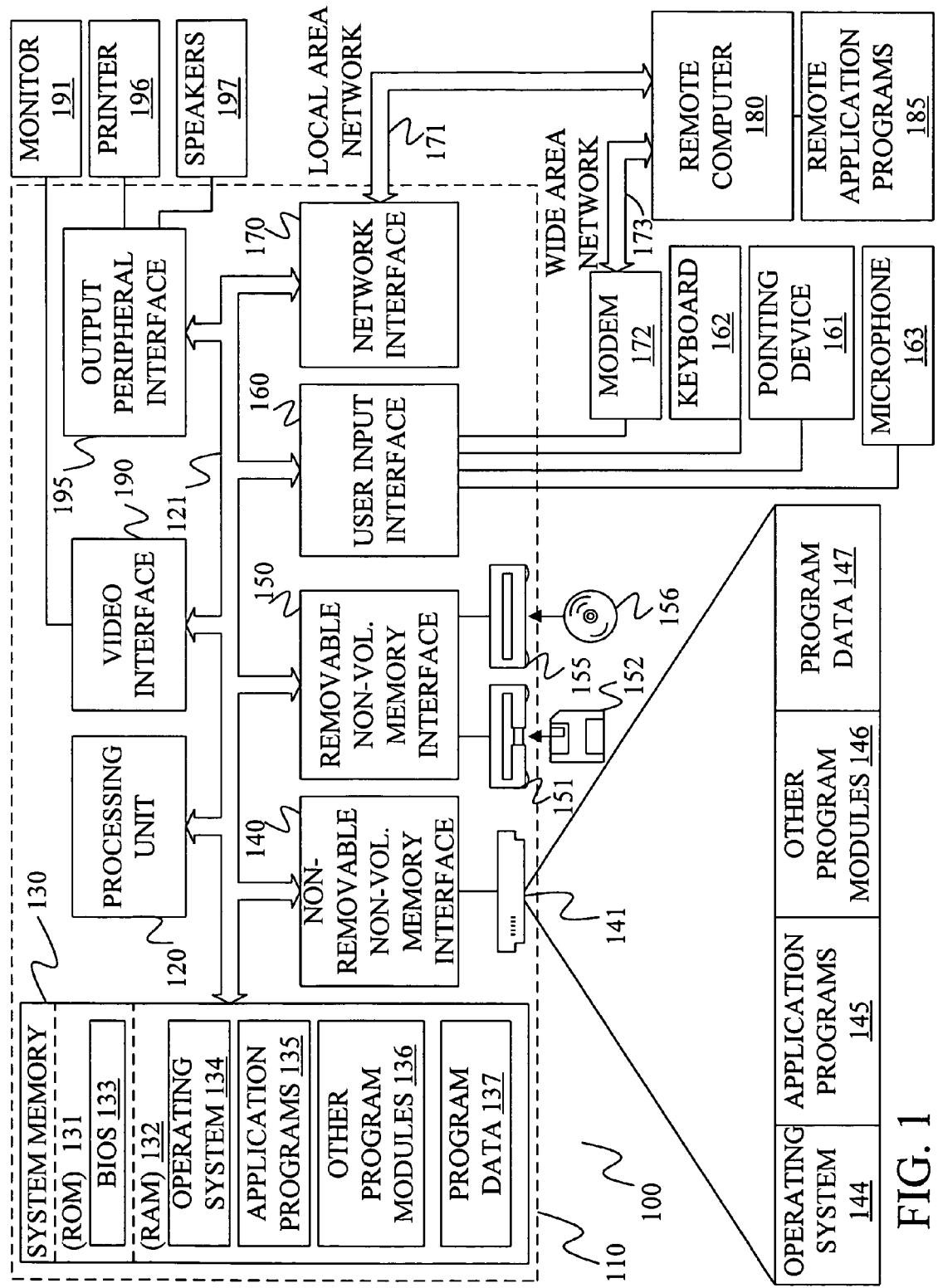
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
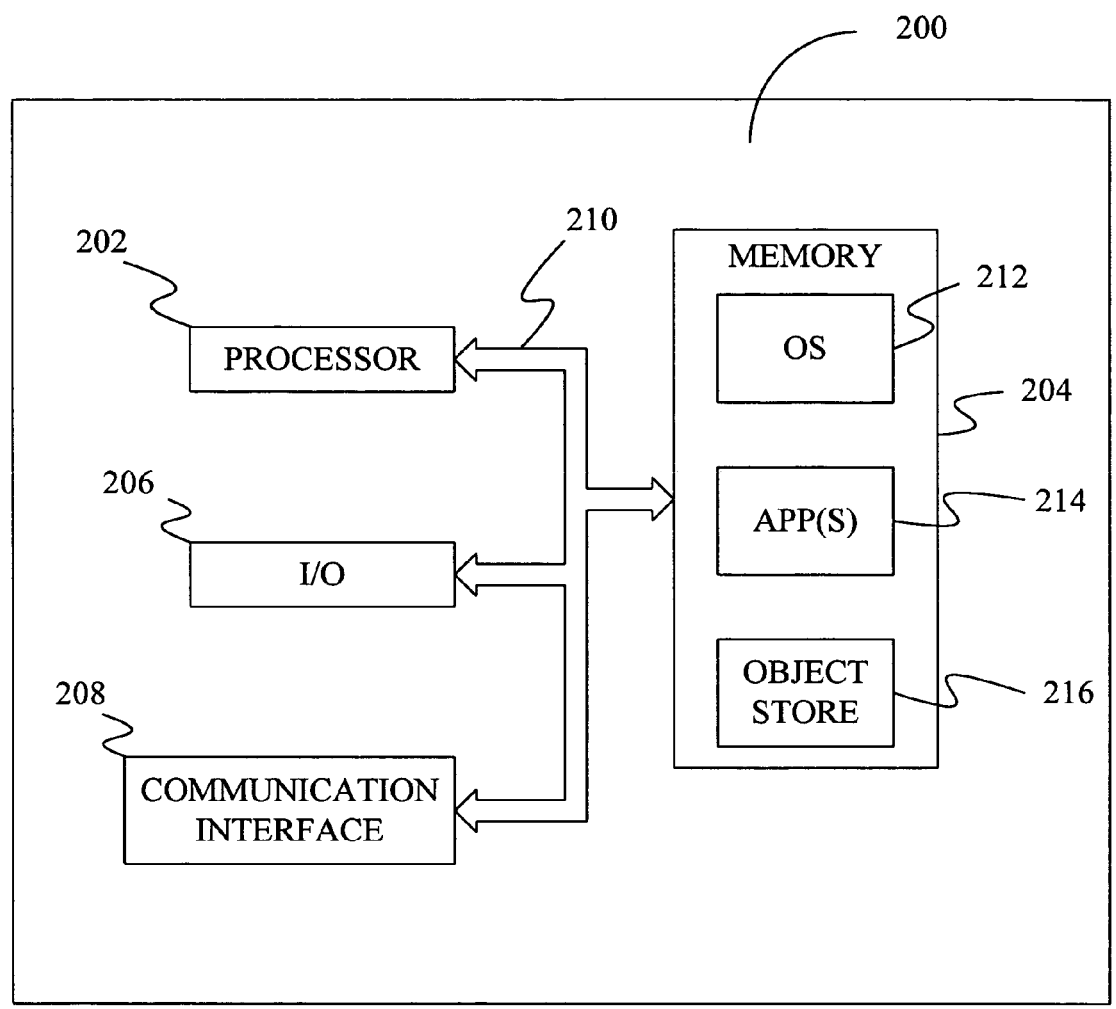
FIG. 2 is a block diagram of an alternative computing environment in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3:
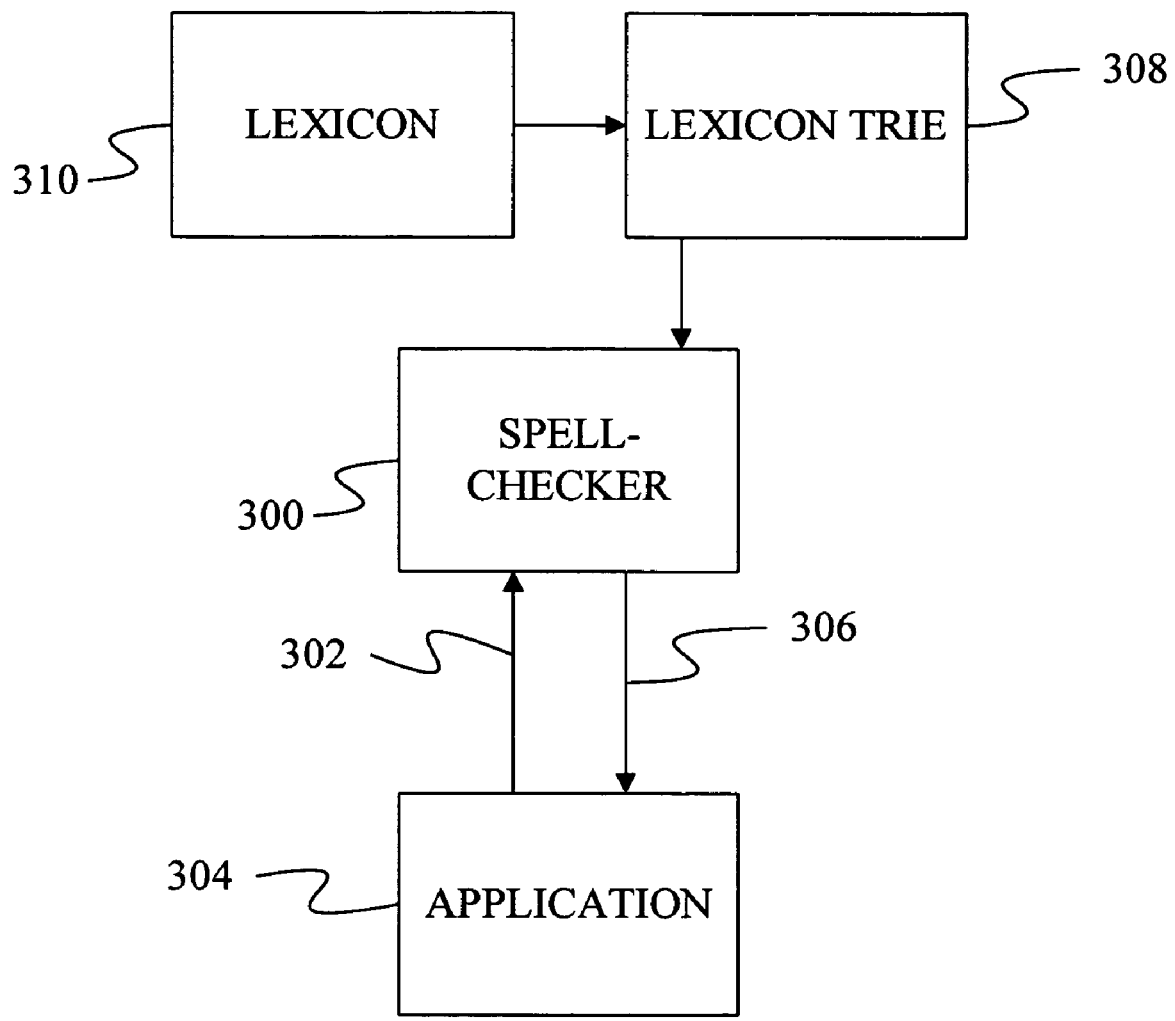
FIG. 3 is a block diagram of a spell checking system under one embodiment of the present invention.

As shown in FIG. 3, the present invention provides a spell checking module 300, which receives a text 302 from an application 304 and returns an indication of whether the text is misspelled and possible suggestions for correcting the spelling error in a set of return messages 306. During spell checking, spell checker 300 traverses through a lexicon trie 308, which is a search structure that contains all of the words and grammatical information in a lexicon 310. In lexicon trie 308, a tree structure is provided with each branch of the tree representing an additional letter in a word and each node of the tree marked by an "end of word" tag representing a separate word in lexicon 310. This tree structure allows words that share common letter strings to be stored efficiently. For example, "big" and "bigger" can share the same branches for the first three letters "big" in lexicon trie 308. Thus, lexicon trie 308 provides an efficient structure for storing and searching the words in lexicon 310.

Lexicon trie 308 also includes grammatical information for each lexical entry in lexicon 310. In particular, each complete word node in lexicon trie 308 identifies the part of speech of the word, whether the word is singular or plural, whether it is masculine or feminine, and for verbs, the tense of the verb (future, past, or present), the grammatical person of the verb (first person, second person, or third person), whether the verb is transitive or intransitive, and whether the verb is an auxiliary. Note that these are examples of grammatical information and additional grammatical information may be provided in each complete word node. In addition, some of the grammatical information listed above may not be present in certain embodiments of the present invention.

Figure 4:
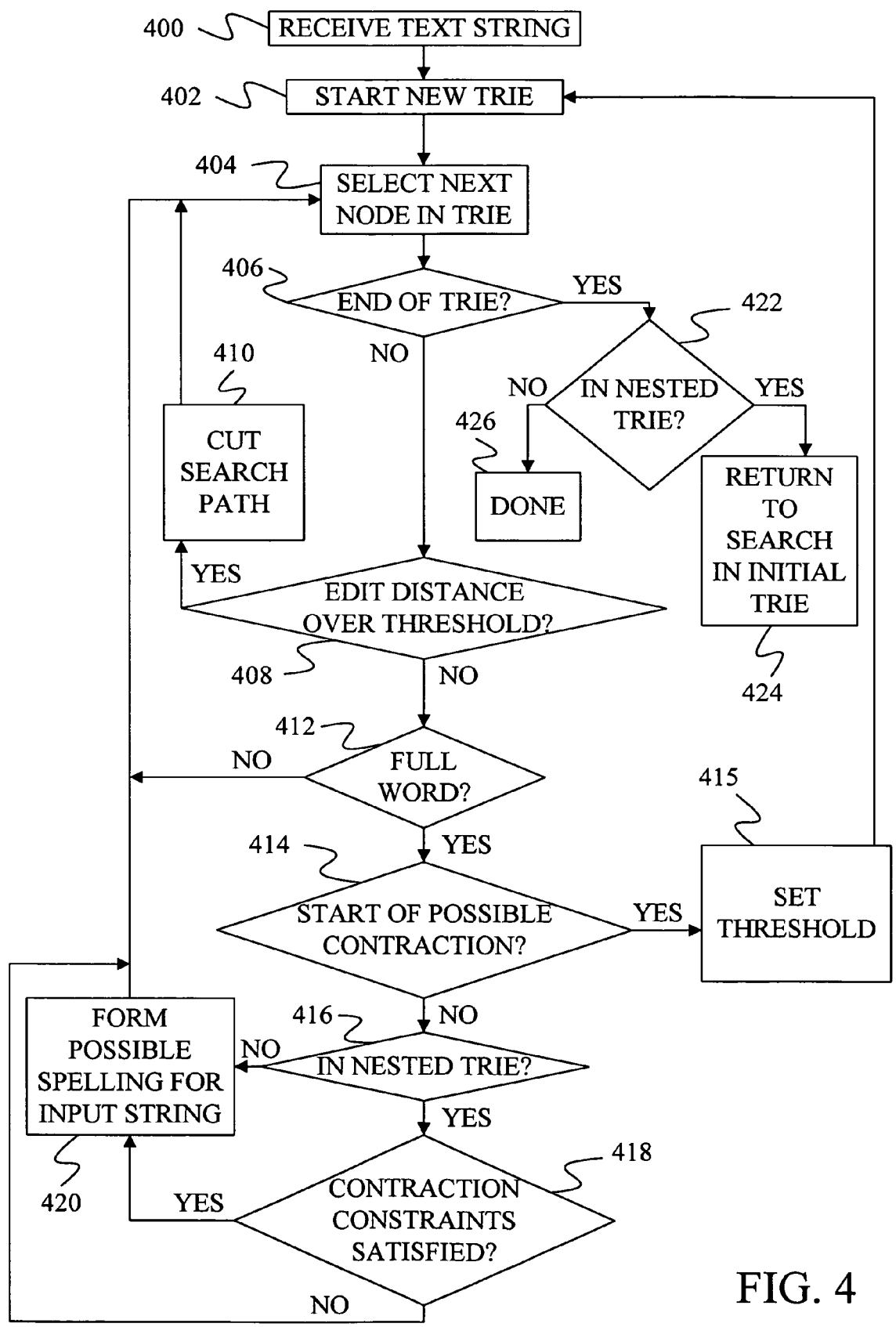
FIG. 4 is a flow diagram of a method identifying properly spelled words involving contractions under embodiments of the present invention.

Under the present invention, spell checker 300 is able to use the grammatical information in lexicon trie 308 to identify possible suggestions for spelling errors involving contractions without requiring all of the contractions to be listed in lexicon trie 308 or lexicon 310. FIG. 4 provides a flow diagram of a method under the present invention for providing such suggestions.

In step 400 of FIG. 4, spell checker 300 receives a text string from the application 304. At step 420, the spell checker starts a new trie, which involves setting a pointer that indicates a current location in the trie to point at the root node of the trie.

At step 404, a next node in the trie is selected. Under one embodiment, the trie is traversed by sequentially selecting nodes, where each node represents a separate letter. By traversing the entire trie structure, it is possible to form each word in the lexicon. Although it is possible to traverse the entire trie structure and thus reach each word in the lexicon, this is seldom done in practice to improve efficiency. In particular, a cutoff threshold is used to avoid consideration of words that are substantially different from the input text string.

At step 406, the method determines if the end of the trie has been reached. This will occur when the entire structure has been traversed. If the end of the trie has not been reached at step 406, the process continues at step 408 where the string of letters represented by the current location in the trie is compared to the same number of letters in the input text string to determine an edit distance between the text string and the current letter string of the trie. The edit distance is measured based on the number of characters that must be inserted into the trie string, deleted from the trie string, or replaced in the trie string to form the corresponding letters in the input test string. The calculation of such edit distances are well known in the art. Note that the present invention is not limited to a particular technique for calculating the edit distance and other edit distance calculations such as one that applies a higher cost to a deletion of the first letter of a word may be used with the present invention.

If the difference between the trie string and the input text string creates an edit distance that is over some threshold, the current search path of the trie is cut at step 410 and a new node in the trie is selected. By cutting the search path, any words that could be formed in the trie from the existing trie string are no longer considered. For example, if the trie string "cor" had an edit distance that was over the threshold for the input string, the search path would be cut so that words such as "corn", "core", and "corp" would not be compared to the input text string. However, other words that could be formed with the first two letters "co" would still be compared. For example, "colt" could be compared to the input text string.

If the edit distance for the current trie string is not over the threshold, the method of FIG. 4 then determines if the current trie string represents a full word at step 412. Each string of letters in the lexicon trie that forms a complete word is marked as a complete word in the trie. Under one embodiment, this is done by including full word markers as end nodes for complete words in the trie.

If the current trie string is not a full word, the process returns to step 404 to select a next node in the trie.

If the current trie string is a full word, it is examined at step 414 to determine if it is the beginning of a possible contraction.

Under the present invention, a set of elided words, represented as text strings followed by apostrophes, are stored in the trie as being full words. These strings represent the beginning portions of contractions. In particular, the following elided words with apostrophes are designated as full words in the trie under the present invention:

l', d', n', c', j', m', t', s', qu', puisqu', lorsqu', presqu', jusqu', quoiqu' ç'

In determining whether the input text string represents a contraction, step 414 first determines if the portion of the trie string before the apostrophe matches, except for differences in case, the corresponding text in the input text string. If it does not match, the input text string is not considered as containing a contraction.

Next, the next letter in the input text string after the portion that matches the trie string (without the apostrophe) is examined to determine if it is a vowel. The list of possible vowels for a French embodiment of the present invention includes: a, e, i, o, u, é, è, ë, ê, â, à, î, ï, ô, ö, ü, û, á, í, ó, ú, À, Â, Á, É, Ê, È, Æ, æ, Œ, œ, Í, Ó, Ú, Ü

If the next letter in the text string is not a vowel, step 414 does not consider this to be the start of a possible contraction.

If it is determined at step 414 that the input text string may contain a contraction, a new threshold is set for the edit distance at step 415. This new threshold prevents the consideration of any words with large differences between the input text string and the trie string for the portion of the input string after the elided word. By setting this threshold to be smaller, only small manipulations, such as capitalization or missing accents will be allowed when considering possible suggestions for the proper spelling of the contraction. Alternatively, the threshold can be left the same and a flag can be set to prevent any more editing of the string to occur. With this flag set, substitutions, insertions and deletions cannot be performed but case-change and the addition of accents can be performed.

After the threshold has been set, a new trie is started at step 402. In starting the new trie, a new pointer is created which points to the root node of a second trie. This allows a new search to be performed for the second part of the contraction by traversing the entire trie once again. Note that the new trie contains the same information as the initial trie.

At step 404, the next node in the second trie is selected and at step 406, the determination is made as to whether the end of the second trie has been reached.

At step 408, the edit distance between the trie string of the second trie and that portion of the input text string that continues after the elided form is compared to the reduced threshold of the second trie. For example, if the input text string is "quil", which has a correct form of qu'il, the elided form is "qu" and the portion of the text string that is compared in step 408 to the trie string of the second trie begins with the letter "i".

As discussed above, if the edit distance is over the threshold, the search path is cut at step 410 in the second trie. If the edit distance is not over the threshold, the method determines if the trie string represents a full word at step 412. Note that the full word is only that portion after the elided word of the input text string. If a full word has not been reached at step 412, the next node in the second trie is selected at step 404.

When a full word has been identified at step 412, the process determines if this is the start of a possible contraction at step 414. Since the method is in a nested second trie at step 414, it is not possible that a contraction is being started. As such, the method proceeds to step 416 where it determines if it is in a nested second trie. If it is in a nested second trie at step 416, the method determines if additional contraction constraints are satisfied by the full word at step 418.

The additional contraction constraints of the present invention use grammatical information to limit which contractions will be formed from the lexicon. In particular, this grammatical information ensures that contractions identified as properly spelled by the method of the present invention are grammatically correct such that there is agreement between the elided form and the remainder of the contraction. The table below provides a list of the part of speech and grammatical information constraints that are associated with various elided forms for a French embodiment of the present invention.

TABLE 1

| Elided form | Allow insertion of apostrophe only if following word (after apostrophe) has the following bits or POS: | Input | Desired output |
|---|---|---|---|
| j' | (Pers1 + Verb) or (Pron) | jaimerais jen | j'aimerais j'en |
| t' | (Verb) or (Pron) | taimerait ten | t'aimerait t'en |
| s' | (Pers3 + Verb) or (Pron) | sest | s'est |
| m' | (Verb) or (Pron) | maime men | m'aime m'en |
| n' | (Verb) or (Pron) | nest nen | n'est n'en |
| c' | (Pers3 + Verb + Aux) | cest | c'est |
| c' | (Pers3 + Verb + Aux) | caurait | c'aurait |
| l' | no constraint | | |
| d' | no constraint | | |
| qu' | no constraint | | |
| puisqu' | no constraint | | |
| jusqu' | no constraint | | |
| lorsqu' | no constraint | | |
| quoiqu' | no constraint | | |

In table 1, "pers1+verb" indicates that the full word after the elided form must be a first person verb, "pers3+verb" indicates that full word must be a third person verb, "pron" indicates that the full word must be a pronoun, "verb" indicates that the full word must be some type of verb, and "pers3+Verb+Aux" indicates that the full word must be a third person verb that is also an auxiliary verb.

If the constraints of table 1 are satisfied, a possible spelling for the input word is formed at step 420 by forming a contraction that includes the elided form with an apostrophe followed by the full word identified in the second trie. This possible spelling can be compared to the input string to determine if the string is spelled correctly. It can also be used as a suggestion for the proper spelling of the input text.

After the possible spelling has been formed, the next node in the second trie is selected at step 404. The steps of FIG. 4 continue to traverse through the second trie thereby forming contractions for each full word, referred to herein as third complete word, fourth complete word, etc., that meets the contraction constraints for the elided form that was identified before entering the second trie and that is within the threshold edit distance of the input text string. Each formed contraction can be compared to the input string to see if the input string is properly spelled and/or can be used as a suggested correct spelling for the input text. When the end of the second trie is reached at step 406, there are no further words to be evaluated in the second trie and the process continues at step 422.

In step 422, the process determines if it is in a nested trie. If it is in a nested trie, it returns to search the initial trie at step 424. This involves returning to the pointer of the initial trie, which is located at the apostrophe of the elided form. The next node in the initial trie is then selected at step 404. Steps 406, 408, 410, 412, and 414 are then performed to look for the start of other contractions and other possible full words that are within the edit distance of the threshold for the initial trie. If a full word is found in the initial trie at step 412 and it is not part of a possible contraction at step 414, the word will be identified as a possible spelling for the input word at step 420 via step 416.

If the start of a second possible contraction is determined at step 414, the threshold for a new trie is set again at step 416 and a new trie is started at step 402 by generating a new pointer to the root node of the trie. Thus, multiple nested tries may be searched during the search for spelling suggestions under the present invention.

When the end of the initial trie has been reached at step 406, and it has been determined that the initial trie is not a nested trie at step 422, the process ends at step 426.

By using grammatical information in determining possible spellings for an input text string, the present invention reduces the number of poor suggestions that are made to the user thereby building confidence in the spell checker. In addition, by not requiring each possible contraction to be stored in the lexicon, the present invention reduces the amount of information that must be stored in the lexicon, thereby improving the storage efficiency for the lexicon and lexicon trie.

Although the present invention has been discussed with reference to a French embodiment, the methods of the present invention may be practiced with other languages Although the present invention has been described with reference to particular embodiments, workers skilled in the art will recognize that changes may be made in form and detail without departing from the spirit and scope of the invention.

What is claimed is:

1. A method of identifying a properly spelled word from an input string, the method comprising:

a processor receiving an input string representing a misspelled word, the word being misspelled based in part on a contraction;

the processor identifying a first part of the input string as representing a part of a possible contraction of two words by searching a lexicon storage structure and locating a text string designated as a first complete word that ends in an apostrophe and matches the first part of the input string with the exception of the apostrophe and case differences, the located text string designated as a first complete word being one of a set of text strings consisting of: l', d', n', c', j', m', t', s', qu', puisqu', lorsqu', presqu', jusqu', quioiqu', and ç';

the processor determining if the next letter in the input string after the first part of the input string is a vowel and if the next letter is not a vowel, the processor determining that the first part of the input string does not represent part of a contraction;

the processor identifying a second part of the input string as representing a second complete word in the lexicon storage structure;

the processor retrieving grammatical information for the second complete word from the lexicon storage structure;

the processor using the grammatical information to determine if the second complete word satisfies a grammatical constraint of the first complete word wherein the grammatical constraint for the first complete word j' requires that the second complete word be either a first person verb or a pronoun, wherein the grammatical constraint for the first complete word t' requires that the second complete word be a verb or pronoun, wherein the grammatical constraint for the first complete word s' requires the second complete word to be a third person verb or a pronoun, wherein the grammatical constraints for the first complete words m' and n' require the second complete word to be a verb or a pronoun; and wherein the grammatical constraints for the first complete words c' and ç' require the second complete word to be a third person verb that is also an auxiliary verb; and the processor identifying a contraction formed by combining the first part of the input string, an apostrophe and the second complete word in the lexicon storage structure into a properly spelled word based on the determination that the second complete word satisfied the grammatical constraint.

2. The method of claim 1 wherein identifying a second part of the input string comprises performing a second search of the lexicon storage structure.

3. The method of claim 2 wherein identifying a second part of the input string further comprises locating a second complete word during the second search of the lexicon storage structure that is within a threshold distance of the second part of the input string.

4. The method of claim 1 wherein determining if the second complete word satisfies a grammatical constraint comprises determining if the part of speech of the second complete word satisfies a part of speech constraint.

5. The method of claim 1 wherein determining if the second complete word satisfies a grammatical constraint comprises determining if the grammatical person of the second complete word satisfies a grammatical person constraint.

6. The method of claim 1 wherein identifying a contraction further comprises placing an apostrophe between the first part of the input string and the complete word to form the properly spelled word.

7. A computer-readable storage medium having computer-executable instructions for performing steps comprising:

receiving an input text string representing a misspelled contraction;

initiating a first traversal of a lexicon search structure;

finding an elided word in the lexicon search structure that corresponds to a portion of the input text string during the first traversal of the lexicon search structure, the elided word having a text string that matches the portion of the input text string and ending with an apostrophe, the elided word marked as a complete word in the lexicon search structure, the entire elided word consisting of a string from a set of strings consisting of: l', d', n', c', j', m', t', s', qu', puisqu', lorsqu', presqu', jusqu', quioiqu', and ç';

determining that the portion of the input text string is a possible part of a contraction by determining that the next letter after the portion is a vowel;

initiating a second traversal of the lexicon search structure after determining that the portion of the input text string is part of a possible contraction and not initiating a second traversal of the lexicon search structure if the letter after the portion of the input text string is not a vowel;

finding a second complete word in the lexicon search structure that corresponds to a second portion of the input text string during the second traversal of the lexicon search structure;

continuing the second traversal of the lexicon search structure;

finding a third complete word in the lexicon search structure that corresponds to the second portion of the input text string during the second traversal of the lexicon search structure;

combining the elided word and the second complete word to form a properly spelled word; and combining the elided word and the third complete word to form a second properly spelled word.

8. The computer-readable storage medium of claim 7 wherein initiating a first traversal and initiating a second traversal comprises initiating the first and second traversals at the. same point in the lexicon search structure.

9. The computer-readable storage medium of claim 7 wherein initiating a second traversal of the lexicon search structure comprises pausing the first traversal of the lexicon search structure until the second traversal of the lexicon search structure is complete.

10. The computer-readable storage medium of claim 9 further comprising continuing the first traversal of the lexicon search structure after the second traversal of the lexicon search structure is complete.

11. The computer-readable storage medium of claim 10 further comprising finding a complete word in the lexicon search structure that corresponds to the entire input text string during the first traversal of the lexicon search structure.

12. The computer-readable storage medium of claim 7 wherein combining the elided word and the second complete word comprises determining if the second complete word satisfies a grammatical constraint associated with the elided word before combining the elided word and the second complete word.

13. A computer-readable storage medium having computer-executable instructions for performing steps comprising:

identifying separate lexical entries for different parts of an input word;

determining if grammatical information associated with one of the lexical entries satisfies a constraint associated with another of the lexical entries wherein the constraint associated with a lexical entry j' requires that a lexical entry be either a first person verb or a pronoun in order to form a contraction with j', wherein the constraint associated with a lexical entry t' requires that a lexical entry be a verb or pronoun in order to form a contraction with t', wherein the constraint associated with lexical entry s' requires that a lexical entry be either a third person verb or a pronoun in order to form a contraction with s', wherein the constraints associated with lexical entries m' and n' require that a lexical entry be either a verb or a pronoun in order to form a contraction with m' or n', and wherein the constraints associated with the lexical entries c' and ç' require that a lexical entry be a third person verb that is also an auxiliary verb in order to form a contraction with c' or ç'; and forming a properly spelled word by combining the separate lexical entries if the grammatical information satisfies the constraint.

14. The computer-readable storage medium of claim 13 wherein identifying separate lexical entries comprises performing a first search of a lexicon using a first part of the input word and a second search of the lexicon using a second part of the input word.

* * * * *